United States Patent [19]
Campbell et al.

[11] Patent Number: 5,050,020
[45] Date of Patent: Sep. 17, 1991

[54] CARTRIDGE LOADER FOR LOADING EACH OF A PLURALITY OF CARTRIDGES INTO A CARTRIDGE INSERTION SLOT

[75] Inventors: Kenneth C. Campbell, Orange, Calif.; Roger M. Gray; Barry C. Kockler, both of Lewisville, Tex.

[73] Assignee: Archive Corporation, Costa Mesa, Calif.

[21] Appl. No.: 434,036

[22] Filed: Nov. 9, 1989

[51] Int. Cl.[5] ............................................. G11B 15/68
[52] U.S. Cl. ........................................ 360/92; 360/71
[58] Field of Search ................. 360/71, 92; 369/34–38

[56] References Cited

U.S. PATENT DOCUMENTS

| | | | |
|---|---|---|---|
| 3,453,397 | 7/1969 | Miller et al. | |
| 3,817,607 | 6/1974 | Anderson | 352/74 |
| 3,860,964 | 1/1975 | Kozu et al. | 360/92 |
| 4,133,013 | 1/1979 | Fisher | 360/92 |
| 4,561,078 | 12/1985 | Nakayama | 369/38 |
| 4,573,091 | 2/1986 | Barton, Jr. et al. | 360/96.5 |
| 4,608,615 | 8/1986 | Zeavin | 360/96.5 |
| 4,635,150 | 1/1987 | Kato et al. | 360/98 |
| 4,652,939 | 3/1987 | Baumeister | 358/342 |
| 4,653,037 | 3/1987 | Nakayama et al. | 369/38 |
| 4,697,215 | 9/1987 | Hata | 360/95 |
| 4,835,634 | 5/1989 | Ostwald | 360/92 |
| 4,860,133 | 8/1989 | Barasnski | |
| 4,912,575 | 3/1990 | Shiosaki | 360/92 |
| 4,918,548 | 4/1990 | O'Donnell et al. | |
| 4,954,915 | 9/1990 | Koda et al. | 360/92 |
| 4,993,010 | 2/1991 | Kishimura et al. | 369/36 |

OTHER PUBLICATIONS

Summas TM Computer Systems, Form No. 30208, Feb., 1989.
"DAT Stackers—Automated Media Comes of Age," Data Concepts News, Oct. 1989.

Primary Examiner—A. J. Heinz
Assistant Examiner—Jefferson Evans
Attorney, Agent, or Firm—Knobbe, Martens, Olson & Bear

[57] ABSTRACT

The present invention provides an automated cartridge loader 10 of novel design for use with a cartridge drive 12. In accordance with one aspect of the present invention, there is provided a sequentially loading cartridge loader 10 which allows the unattended storage of gigabytes of data. The loaders are adapted to be attached to a cartridge drive 12. The novel loaders of the present invention may comprise three moving components: the magazine 30, the pusher 91, and the gripper 93. Each moving component has its own drive motor 80, 94, 146. The magazine 30 has a plurality of slots 40 for holding cartridges 38 which are loaded into a cartridge drive 12. The pusher 91 of the present invention is aligned with the cartridge drive 12 and pushes the cartridges 38 into the cartridge drive 12. The gripper 93 closes on a cartridge 38 after it is ejected from the cartridge drive 12 and holds the cartridge 38 as the pusher 91 moves back to pull the cartridge 38 back into its slot 40 in the magazine 30. There is additionally provided a method of sequentially loading cartridges 38 into a cartridge drive 12 using the novel cartridge loader 10.

19 Claims, 10 Drawing Sheets

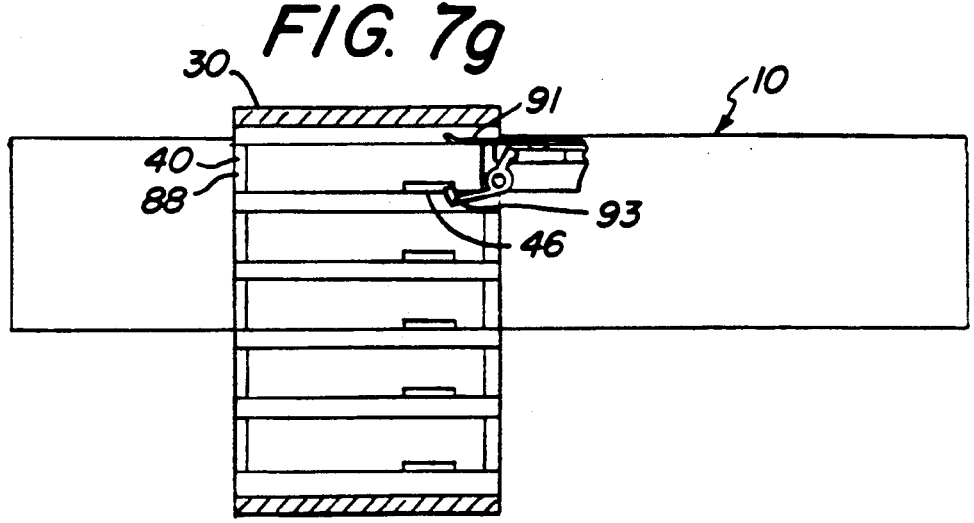
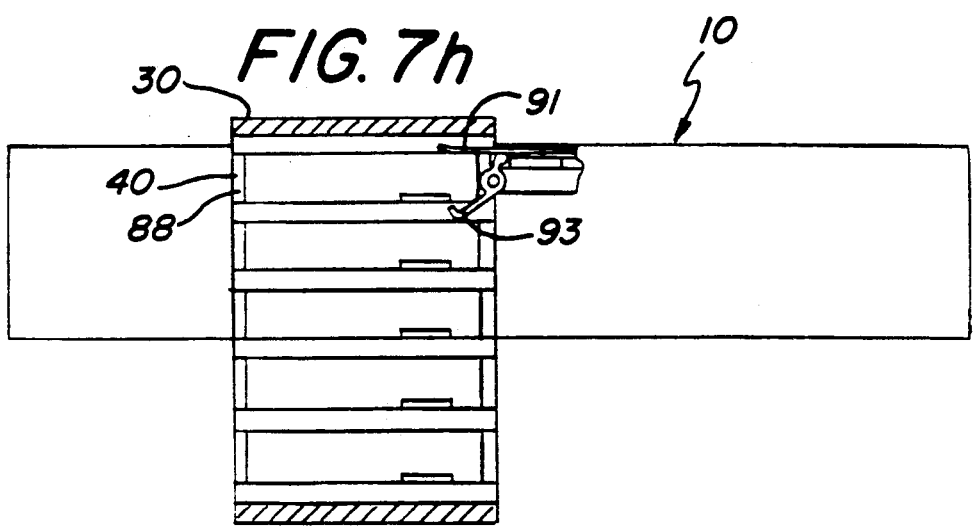
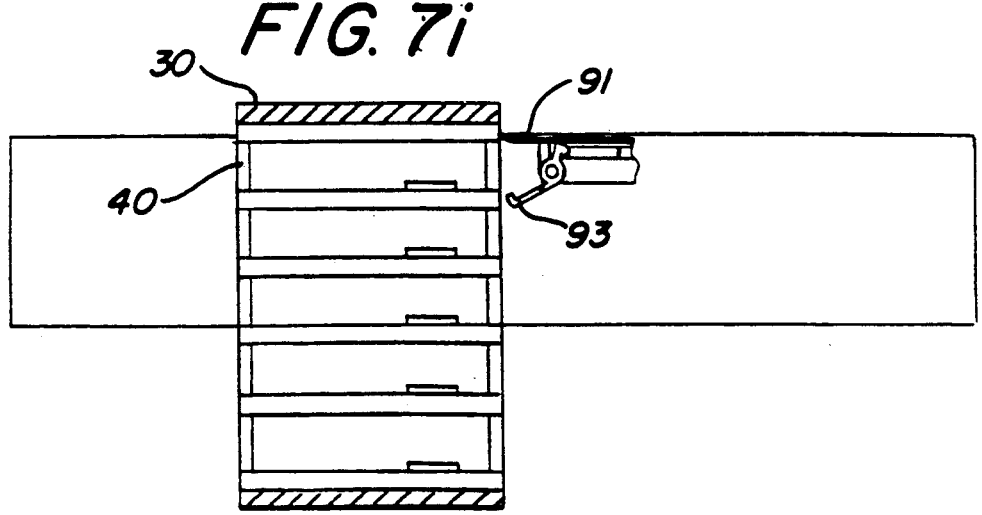

CARTRIDGE LOADER FOR LOADING EACH OF A PLURALITY OF CARTRIDGES INTO A CARTRIDGE INSERTION SLOT

BACKGROUND OF THE INVENTION

The present invention relates generally to the field of cartridge loaders. More specifically, the present invention relates to loaders which sequentially load each of a plurality of cartridges into a cartridge drive.

Most personal and small business computers were originally designed for the use of flexible or floppy disk memories. Devices for the unattended sequential loading of floppy disks have been developed for a variety of uses. These devices generally include a hopper wherein the disks are stacked for loading into a disk drive. Generally, these devices have been used for making multiple copies of the same program. The use of these devices for storage of large amounts of data on disks has generally proven unsatisfactory due to the large number of disks involved and the difficulty in retrieving data from them.

To ensure the interchangeability of flexible disk and other drives, an industry standard has been established which requires that these drives be constructed so that they fit within a "full height form factor" (of approximately 3 ¼ inches (8.3 cm) in height by 5 ¾ inches (14.6 cm) in width by 8 inches (20.3 cm) in length) or a "half height form factor" (of approximately 1 ⅝ inches (4.1 cm) in height by 5 ¾ inches (14.6 cm) in width by 8 inches (20.3 cm) in length).

The 5 ¼ inch (13.3 cm) tape drive has achieved great popularity for backing up the data of a personal or small business computer, due to its high storage capacity and rapid data access capability. However, more recently, R-DAT drives have been developed which store much more data within an even more rapid data access capability. Most users prefer internal drives. The increasing standardization of the computer industry requires that these internal R-DAT drives, like all drives, fit within the full or half height form factor described above.

A standard R-DAT tape may hold up to 1.3 gigabytes of data. However, many applications, including archival storage, journaling, online and background storage, and the unattended back-up of large amounts of data, may require storage of several times that amount of data. When backing up a data source of more than 1.3 gigabytes, it is necessary to change the R-DAT tape in a R-DAT cartridge drive approximately every two hours. Since most such backing up is done outside of normal work hours to avoid tying up the computer holding the data, it is often not convenient to change the R-DAT tape. Thus, there is a need for a cartridge loader capable of holding a plurality of R-DAT cartridges for loading sequentially into a R-DAT cartridge drive.

Many computer systems include a plurality of memory storage drives. Indeed, the half height form factor drives are often stacked one on top of the other. Access to all of these drives must be preserved when any accessory, including a cartridge loader, is added to the computer. In order for a cartridge loader to be used most conveniently, it would be desirable to obviate the need to attach and detach the loader for each use. An attached loader which does not block access would need to be adapted to fit within the small 1 ⅝ by 5 ¾ inch (4.1 by 14.6 cm) space of the front of the half height form factor. Thus, there is a need for a loader adapted to fit within that space.

Devices for loading and unloading cartridges have been developed. However, many of these devices are adapted for use only with certain low storage capability cartridges, such as standard audio cassettes. Moreover, many of these devices are quite large and expensive. Many users do not require such large devices, and cannot afford to pay for them. Other loading/unloading devices include an external cartridge drive, resulting in less consumer satisfaction due to preferences their for internal drives and the greater size and expense of the external drives. Many of the devices require an electrical or logical interface with the host computer. The interface requirement restricts the use of the devices to systems for which interfaces have been developed. Thus, there is a need for a small, relatively inexpensive cartridge loader which loads cartridges into an internal tape drive and does not require an electrical interface with the computer to be loaded.

Recently, Predator Systems Corporation announced the development of the Data Hawk I, a 4 mm DAT stacker holding eight DAT cartridges for loading and unloading to a 4 mm DAT cartridge drive. The Data Hawk I has a load/unload cycle time of over 15 seconds and has an anticipated enduser price of approximately $4000. The long cycle time and relatively high price of the device may prove unacceptable to many users. Thus, there remains a need for an inexpensive automated cartridge loader with a short load/unload cycle.

SUMMARY OF THE INVENTION

The present invention comprises a loader for a drive having a cartridge acceptor, including a housing defining an opening, a holder, an assembly for aligning the holder, and a pusher supported by the housing. The holder is mounted within the opening and at least partially defines a plurality of spaces. Each of the spaces is sized and shaped to receive a cartridge. The holder includes supports for supporting a cartridge within each of the spaces. The assembly selectably aligns each of the spaces of the holder with the cartridge acceptor of the drive. The pusher is supported by the housing and pushes a cartridge positioned within one of the spaces to the acceptor of the drive so that the acceptor accepts the cassette.

In the preferred embodiment, the loader further comprises a gripper for gripping a cartridge. Upon the ejection of the cartridge from the drive, the gripper grips the cartridge and is pulled back by the pusher, thereby positioning the cartridge within one of the plurality of spaces.

BRIEF DESCRIPTION OF THE DRAWINGS

FIGS. 7a-7l are schematic representations of the operation of a cartridge in accordance with a preferred embodiment of the present invention.

DETAILED DESCRIPTION OF THE PREFERRED EMBODIMENT

Figure 1:
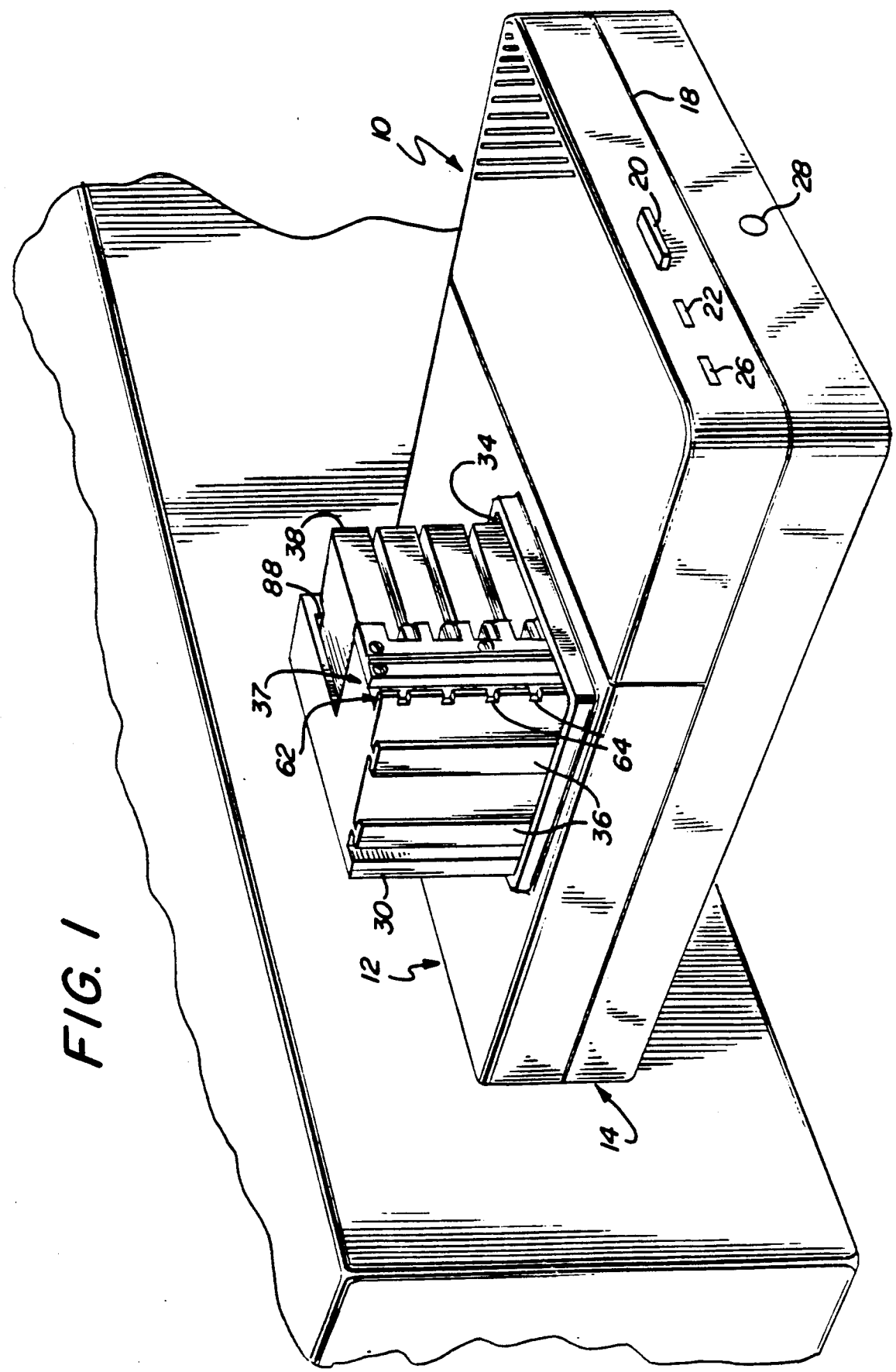
FIG. 1 is a perspective view of a cartridge loader including a magazine attached to a computer tape drive in accordance with one embodiment of the present invention.

Referring now to the drawings in detail, wherein like reference numerals designate like elements throughout the several views and representations thereof, there is shown generally at 10 in FIG. 1, a cartridge loader embodying the present invention in a preferred form. Advantageously, the loader of this embodiment is compatible with the internal configuration of the Archive Python ("Archive" and "Python" are trademarks of Archive Corporation of Costa Mesa, California) R-DAT tape drive 12. However, the loader shown by this embodiment of the invention may be adapted to any front loading R-DAT tape drive compatible with a full or half height form factor which incorporates a standard cartridge acceptor (i.e., a mechanisms for accepting the cassette for engagement of the cassette with the read/write head of the drive). Furthermore, those skilled in the art will appreciate that the advantages of this drive are not limited in application by a particular form factor.

The R-DAT tapes are also adapted to digitally record and play back audio materials. Consumers have in the past expressed a preference for audio components which are capable of playing a plurality of recordings, as seen by the one-time popularity of LP changers and the current popularity of CD changers. Accordingly, the loader may be adapted to attach to a front loading R-DAT audio component.

Preferably, the loader has a generally rectangular box-shaped housing 11. When the embodiment shown in FIG. 1 is mounted, the front bezel (not shown) of the tape drive is removed. The rear 14 of the loader is adapted to mount in the place of the removed front bezel. The rear of the loader is the side of the loader which mounts to the drive 12 and the front of the loader is the side of the loader away from the drive 12. In the preferred embodiment, the functions of the operator panel of the tape drive are incorporated into the front panel 18 of the loader. These features include an eject button 20, a drive status LED 22, and a cassette status LED 26. The eject button 20 will be pressed when it is desired to remove a holder, for example, a five-cartridge magazine 30, from the loader. The LEDs may be of any color, and preferably, have a 40 degree angle and are 50-100 mcd. As an optional feature, an audio jack 28 may also be provided as an output for connecting the drive 12 with a device to transform the digital output of the drive to analog for playback of recorded audio materials.

Advantageously, all of the components of the loader 10, except for the magazine 30, fit within the 1 ⅝ by 5 ¾ inch (4.1 by 14.6 cm) space of the half height form factor. Thus, the mounted loader 10 will not interfere with access to other internal drives of the computer to which the loader is mounted.

Preferably, the loader is mounted to a drive which is more than 1 ⅝ inches (4.1 cm) above the table top. This distance is required to allow translation of the five cartridge-magazine 30 in the vertical plane without hitting the table top. Advantageously, this distance above the table top is achieved when the loader 10 is mounted to the upper drive of two standard half height form factor internal drives stacked one above the other.

The drive 12 and loader 10 combination, may be mounted in any of three positions, including horizontally as shown, or with either the left or right side facing upward.

Figure 3:
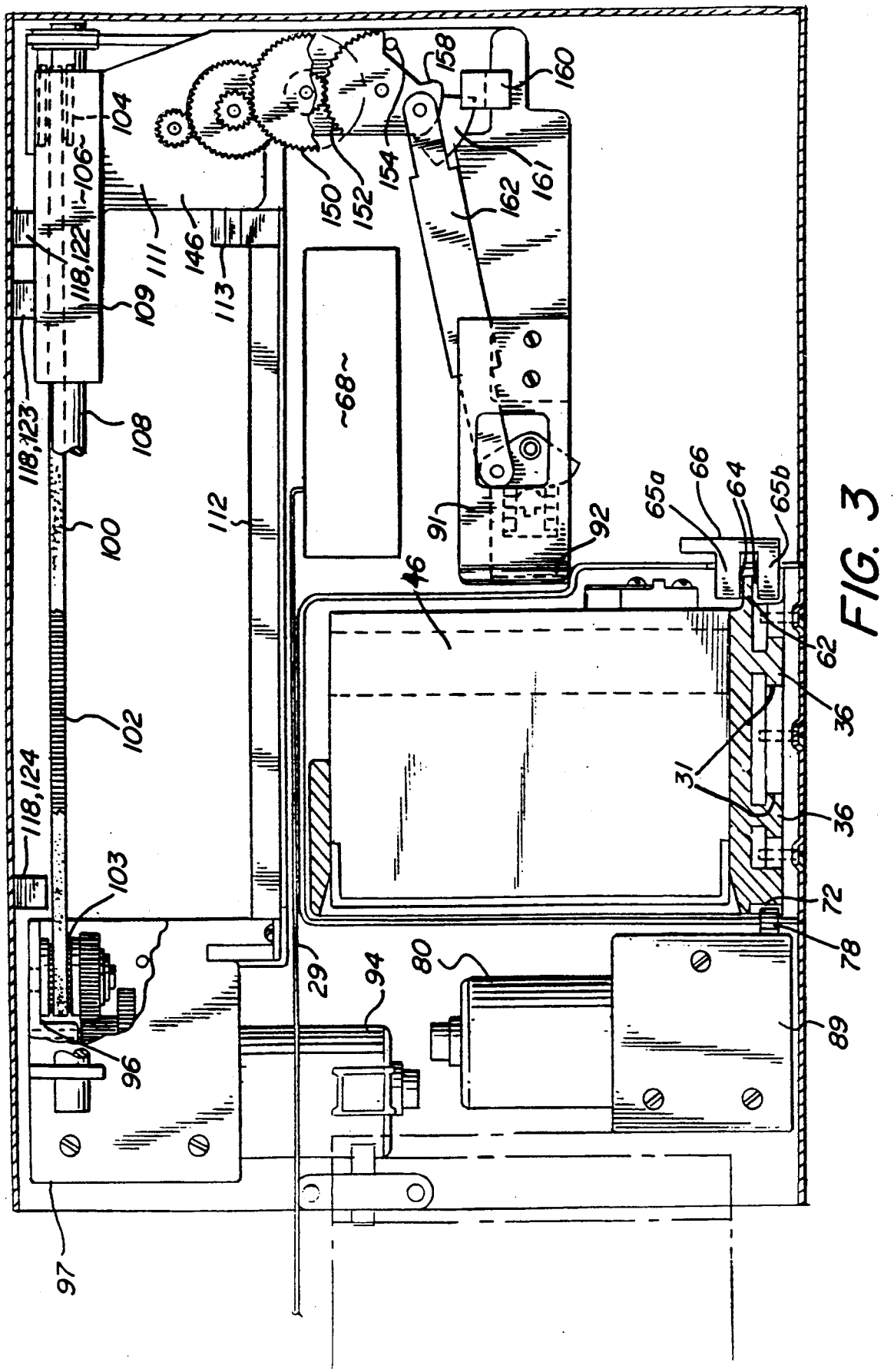
FIG. 3 is a top sectional view of the cartridge loader of FIG. 1, including a magazine; also showing a cartridge, in phantom, partially ejected from the loader.

The loader 10 does not require any electrical interface or any logical connection with the host computer system. The loader 10 can, therefore, operate in any software environment. However, in the preferred embodiment, the loader 10 obtains its power from the host computer system power supply. As seen in FIG. 3, the connection to the system power may be obtained through a pigtail cable 29 from the loader which may, advantageously, be routed internally through the cartridge drive 12. Alternatively, power may be obtained from an external power supply.

In the preferred embodiment, the standard magazine 30 of the loader has a capacity of five R-DAT cartridges. When the loader is mounted to a tape drive 12 in accordance with a preferred embodiment, the standard magazine 30, advantageously, will not hit the table during its translation when the drive/loader combination is mounted in the horizontal plane. The standard magazine's capacity of five cartridges enables the drive to store 6.5 gigabytes of data, unattended by an operator, over a ten hour period Thus, the entire operation can occur during non-working hours, leaving the host computer and drive free for use during working hours. Advantageously, unattended operation of the loader occurs due to the automatic ejection of each cartridge by the drive 12 after it is fully recorded or read, followed by the operation of the loader 10. Magazines with capacities greater or fewer than five may also be accommodated. However, magazines with greater than five cartridge capacity may not be compatible with certain horizontal mount configurations.

Figure 2:
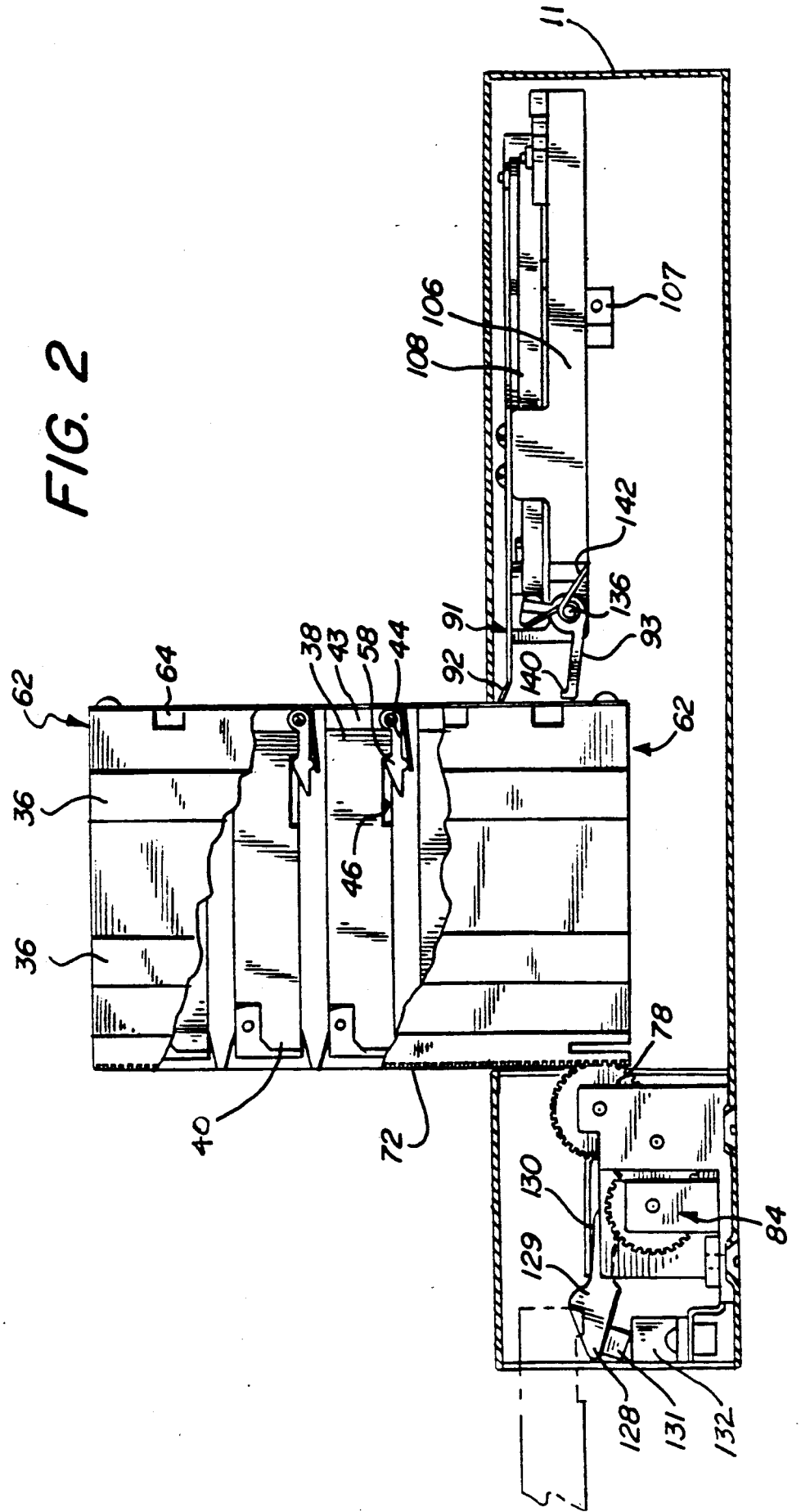
FIG. 2 is a left sectional view of the cartridge loader of FIG. 1, including a partially cut away view of a magazine, showing the magazine slots; also showing a cartridge, in phantom, partially ejected from the loader.

As shown in FIGS. 1 and 2, the magazine 30 may be constructed of rigid molded plastic, or of any other suitable material. The magazine 30 is inserted into the loader 10 through a magazine opening 34 which is a substantially rectangular opening extending vertically through the entire loader. Preferably, the opening 34 defines one or more vertically aligned T-shaped channels 31 along one side. The channels 31 may be formed by plates extending the height of the magazine opening 34, but having different widths and being stacked one on top of each other. The channels are sized and shaped to slidably receive one or more vertically extending guides 36, of T-shaped cross section, which extend along one side of the magazine 30. In the preferred embodiment shown, there are two T-shaped guides 36 and two mating channels 31.

The magazine 30 is supported in a cantilever manner by the housing 11 within the opening 34 in that the magazine's only connection with the housing 11 is along the side of the opening 34 nearest to the wall of the housing 11. Advantageously, the cantilevered design allows the magazine to be driven without excess friction and without devoting excess space to the mounting of the magazine 30. Moreover, the cantilevered design allows the magazine to move freely along the unattached side thereby preventing that side from sticking. Preferably, one of the T-shaped guides 36 fits into its channel 31 more tightly than the other. This arrangement prevents the magazine from being moved more rapidly along one of the channels 31 than the other and causing the magazine 30 to snag during vertical movement.

As best seen in FIG. 2, the magazine 30 defines a plurality of slots or spaces 40 each of which is capable of holding one cartridge 38. The standard magazine of the preferred embodiment described above, therefore, would have five slots 40. The slots 40 are only slightly wider than the width of the cartridges 38, so as to minimize the size of the magazine 30 and to prevent excess sideways motion of the cartridges 38. The slots 40 present a full profile to the rear of the magazine 30. However, in the preferred embodiment, the slots 40 are generally L-shaped in that they are not as wide as the magazine beyond about one inch (2.5 cm) from the rear of the magazine 30. This lowers the weight of the magazine 30 and helps prevent jamming of the cartridge 38 within the slot 40.

Along the front of the magazine, opposite the drive, is a retaining block 37 for preventing the cartridges 38 from being pushed beyond the rear end of the magazine 30 The retaining block 37 may be only a fraction of the length of the front of the magazine 30, as shown, or it may extend across the entire back of the magazine 30. In the preferred embodiment, the retaining block contains a sheet metal plate with tabs 39 bent down into the magazine slot 40 into which the cartridges 38 fit. Cartridge retainers 44 are provided to hold the cartridges 38 in each slot. The tabs 39 serve to provide tension for the cartridge retainers 44 by being bent slightly less than that required to allow the cartridge retainers 44 to fully accommodate the cartridge without being depressed The cartridge retainers 44 may be small shafts with triangular tips which will engage the depression 46 found in the front of the standard R-DAT cartridge 38, thereby retaining the cartridges in their respective slots 40. However, the tension of the cartridge retainers 44 is not so great that it prevents the cartridge 38 from being pushed out of the slot 40 if sufficient force is applied from the front.

When the cartridge 38 is inserted into the magazine slot 40, the cartridge retainer 44 in the slot 40 holds the cartridge 38 securely within the slot 40. The tabs 39 may be located anywhere along the front of the slot 38, however, preferably it is closer to the side of the magazine with the T-shaped guides 36.

Referring to FIGS. 2 and 3, along one corner of the front of the magazine 30, is a vertical flange or strip of opaque material 62, which may be formed of the same material as the magazine 30. The strip 62 includes cut outs 64 at various positions along its length corresponding to each slot 40. The cut outs 64 serve as flags for an electrical magazine sensor 65 which may advantageously be placed within a generally C-shaped magazine guide 66, as emitter 65a and a light sensing detector 65b, or may comprise any other type sensor known by one of skill in the art. The sensor 65 is in electrical connection with a microprocessor board 68, shown in FIG. 3, where the signal is processed.

The magazine is aligned with the acceptor of the drive by means of a linear displacement assembly mounted within the front corner of the loader proximate the channels 31. As shown in FIGS. 2 and 3, in the preferred embodiment, the assembly comprises a motorized gear train 84, positioned in the rear corner of the loader and a train engaging device, such as a rack 72, positioned along the corner of the front side of the magazine 30 proximate the T-shaped guides 36. The grooves of the rack 72 are meshingly engaged by the last gear 78 of the gear train 84. The train 84 includes and is driven by a magazine drive motor 80, as best seen in FIG. 3. The magazine drive motor powers the gear train 84 with a relatively high final drive ratio, approximately 65:1 in the preferred embodiment, in order to move the magazine 30 with relative precision. The high gear ratio also allows the motor 80 to reach its full speed quickly and to operate with less strain.

When the magazine 30 is inserted into the magazine opening 34, the flow of light through the magazine sensor 65 is interrupted by the opaque strip 62. This interruption serves as a signal to the magazine drive circuitry 79 to start the magazine drive motor 80, the rotation of which drives the gear train 84, causing the clockwise rotation (as seen in FIG. 2) of the last gear 78 and moving the magazine 30 downward so that the uppermost, or first cartridge slot 88, is aligned with the acceptor of the drive. Advantageously, conventional drive motor circuits may be used to operate all of the motors of the present invention.

Preferably, the gear train 84 is protected by a gear plate 89 positioned above the gear train 84, to ensure that they are not damaged during operation of the cartridge loader 10 when a cartridge 38 is pushed directly over the gear train 84.

Advantageously, a short delay, preferably less than one second, occurs after the insertion of the magazine 30 in order to allow an operator time to position the magazine rack 72 in meshing engagement with the last gear 78 and remove his or her hand before the magazine drive motor 80 begins movement. This delay may be achieved through the provision of a microprocessor chip within the magazine drive circuit 79. In the preferred embodiment, the total time from insertion of the magazine until the magazine is positioned at the first cartridge slot 88 is approximately 5 seconds. The magazine motor 80 runs open loop until a brake pulse is applied.

In the preferred embodiment, after the magazine drive motor circuitry 79 is signaled by the magazine sensor 65 to begin moving the magazine drive motor 80, movement of the magazine 30 continues until the sensor encounters all but one of the flags 64. As each flag 64 is passed, the flow of light through the sensor 64 will be unblocked as a signal that a magazine slot 40 has been passed. The signal that a slot 40 has been passed is stored in a non-volatile memory device 90, designated as "ROM" in FIG. 6, so that a record is always stored of the position of the magazine. The memory device 90 counts the number of flags 64 encountered. When the penultimate flag 64 corresponding to the second slot (i.e., the slot immediately below the first slot 88) is encountered by the sensor, a timer, advantageously provided as part of the programming of the magazine drive circuit 79, is enabled. The motor 80 continues moving the magazine 30 until the last flag 64 is found by the sensor 65. When the bottom of the last flag, corresponding to the first slot 88, is found by the sensor, a braking pulse is applied to the motor 80 to accurately stop the motor, with the cartridge 38 in the first slot 88 aligned in the same plane as the acceptor of the cartridge drive 12. The first slot 88 of the magazine 30 will be vertically aligned with the acceptor 12 when the flag 64 is approximately in the center of the sensor 65. While in the preferred embodiment, the first cartridge 38 to be loaded is the cartridge 38 in the slot 88 corresponding to the last flag, those skilled in the art will recognize that the loader could operate so that the first cartridge 38 to be loaded is the cartridge 38 in the slot 40 corresponding to the first flag 64.

It is desirable to accurately stop the magazine 30 with the slot 40 in the same plane as the cartridge drive 12, because variations greater than ±1 mm could prevent the cartridge 38 located in the slot 40 from being accepted by the drive 12. Accordingly, the height of the flag 64 is approximately 2 mm, so that as long as the magazine 30 stops with the sensor 65 over the flag 64, the cartridge 38 will be aligned with the drive 12. Different amounts of force are required to stop the motor depending on the orientation of the loader 10 and drive 12 combination and depending on the number of cartridges present in the magazine. Accordingly, in the preferred embodiment, the width of the braking pulse is varied in order to accurately stop the magazine 30.

The brake pulse in the bidirectional dynamic motors of the present invention is a pulse of voltage applied of opposite polarity to that applied in the direction of movement. The width, or time, of the brake pulse is determined from a measurement obtained of the average velocity of the magazine 30 which is taken by measuring the time it takes to move the magazine 30 from the penultimate flag 64 to the last flag 64. From a look-up table within the data storage device 90 associated with the microprocessor 68, the brake pulse is selected which will stop the motor with the magazine 30 in the proper plane. The brake pulse is applied when the bottom of the last flag 64 is aligned with the sensor 65 in order to accurately stop the magazine with the middle of the flag 64 aligned with the sensor 65. Advantageously, the width of the brake pulse is less than that of a brake pulse which would cause the magazine to stop and begin to move in the opposite direction.

As seen in FIG. 3, a pusher 91, driven by a pusher drive system, is used to push the cartridge 38 into the acceptor so that the acceptor will accept the cartridge. In the preferred embodiment, the pusher drive system includes a pusher motor 94, a pusher gear train 96, and a pusher belt 100, and a pusher belt wheel 104.

Figure 5:
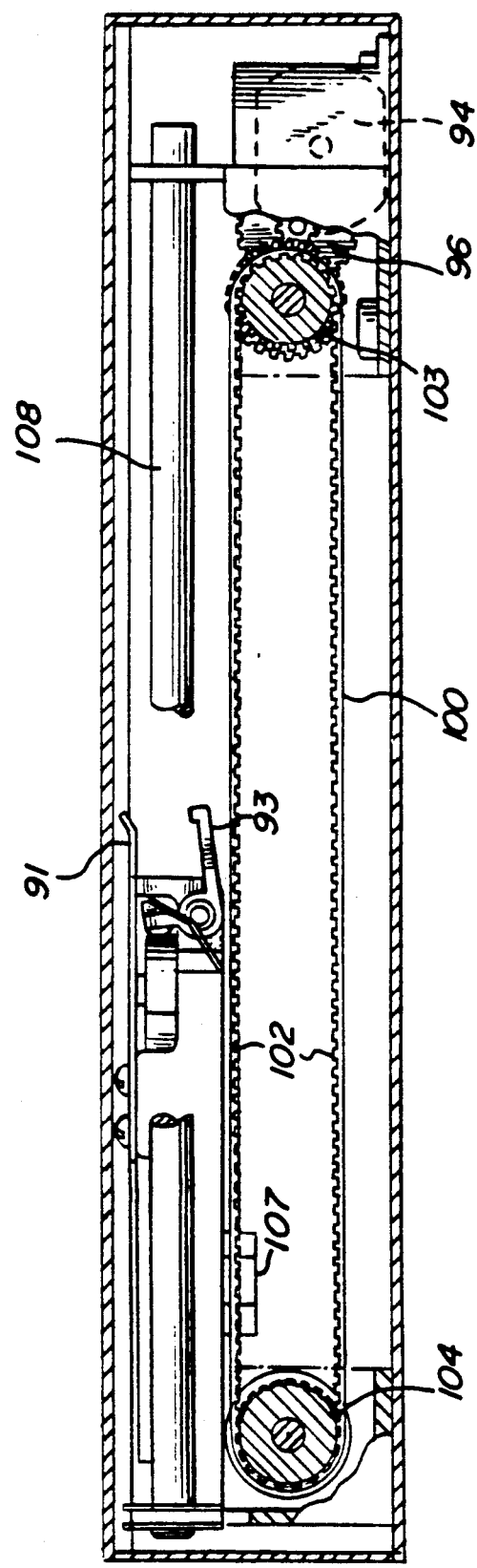
FIG. 5 is a right sectional side view of the cartridge loader of FIG. 1.

The pusher motor 94 drives a system of reduction gears 96, covered by a gear plate 97, which in turn drives a belt 100. As seen in FIG. 3, the pusher motor 94 and its associated gears 96 are mounted in a rear corner of the loader, opposite the magazine drive motor 80 and its gear train 84. As best seen in FIG. 5, the underside of the belt 100 has grooves 102 which interconnect with the last gear 103 of the pusher gear train 96 to cause it to be driven by the pusher motor 94. The belt 100 is held in loop configuration with a pusher belt wheel 104, shown in phantom in FIG. 3, which rotates freely and is located at the front side of the loader, opposite the pusher gears 96.

Figure 4:
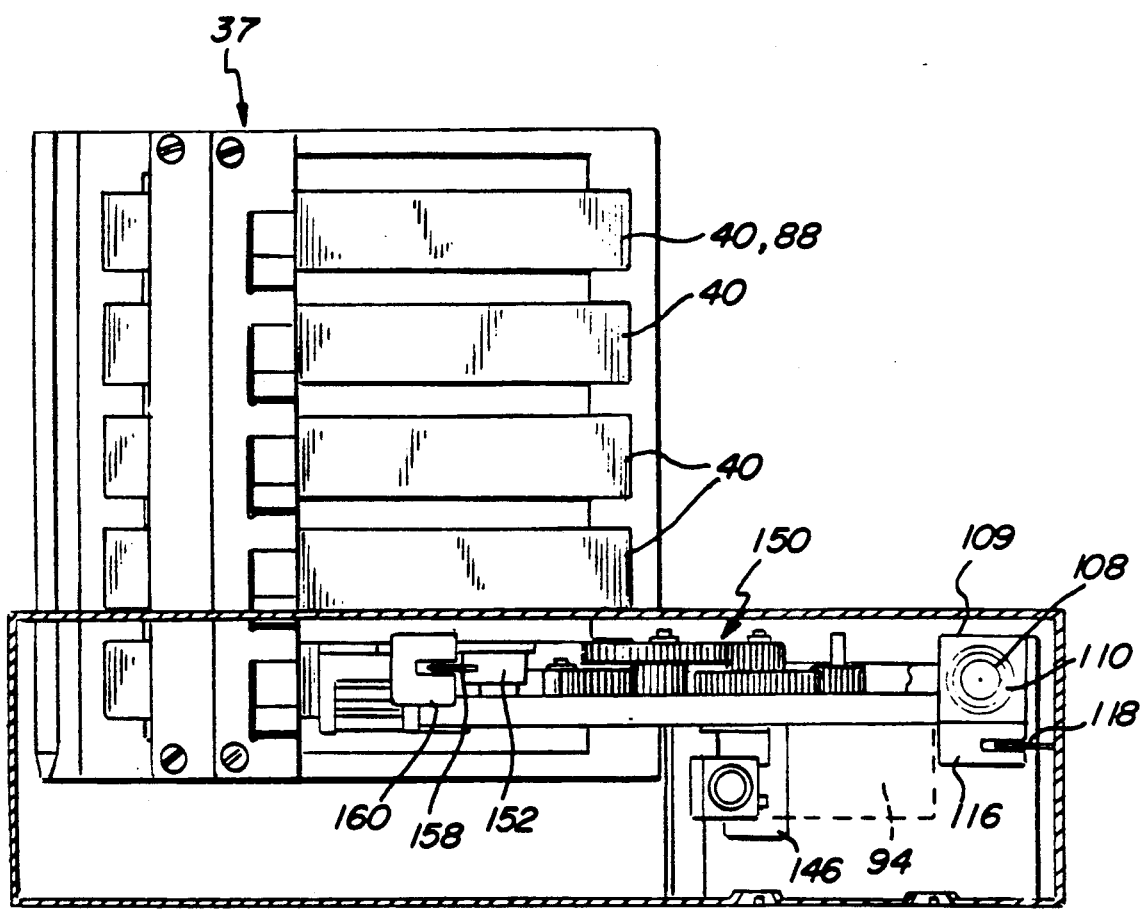
FIG. 4 is a front sectional view of the cartridge loader of FIG. 1.

The pusher carriage 106, upon which the pusher 91 rides, is a three sided piece which comprises a short rectangular piece 109, making up the first side, which is disposed over the belt 100, and a flat component 111 which makes up the other two sides of the pusher carriage 106. The rectangular piece 109 is attached to the belt 100 in a known manner, such as with a clamp 107, seen in FIG. 5. The pusher carriage 106 is thereby moved through the action of the pusher motor 94. The pusher carriage rides along a cylindrical pusher rail 108, shown partially cut away in FIG. 3 to reveal the belt 100. In the preferred embodiment, the rectangular piece 109 has a circular hole 110 cut therethrough which is best seen in FIG. 4. The rectangular piece 109 completely encircles the rail 108, in order to prevent side to side motion.

The rectangular piece 109 is mounted on the flat component 111. The flat component 111 is generally L-shaped with the end of the flat component 111 mounted perpendicular to the rectangular piece The end closest to the rectangular piece 109 is wider than the other part of that side of the flat component 111. The side of the wide portion of the flat component opposite the rectangular piece rides along a side rail 112 on sliding shoes 113. The flat component 111 must be shaped so as not to interfere with other parts of the loader 12. For example, in the preferred embodiment, as seen in FIG. 3, the front corner of the flat component 112 is cut off so as to leave room for the belt wheel 104 when the pusher 91 is in its furthest back position. The side rail 112 is a strip of metal running from the pusher motor 94 to the front of the loader 12 at a height sufficient to keep the pusher 91 horizontal when the rectangular piece 109 is mounted on the pusher rail 108.

The pusher 91 is mounted on the side of the flat component 111 which is parallel to the rectangular piece. That side of the flat component is relatively narrow so as not to interfere with other components of the loader while the pusher carriage 106 is moving. The pusher 91 has a pushing end 92 formed by a planar piece of material which is bent up at one end in order to accommodate the cartridge 38 underneath it. Disposed underneath the pusher 91 is a gripper 93, which is described in more detail below.

Figure 6:
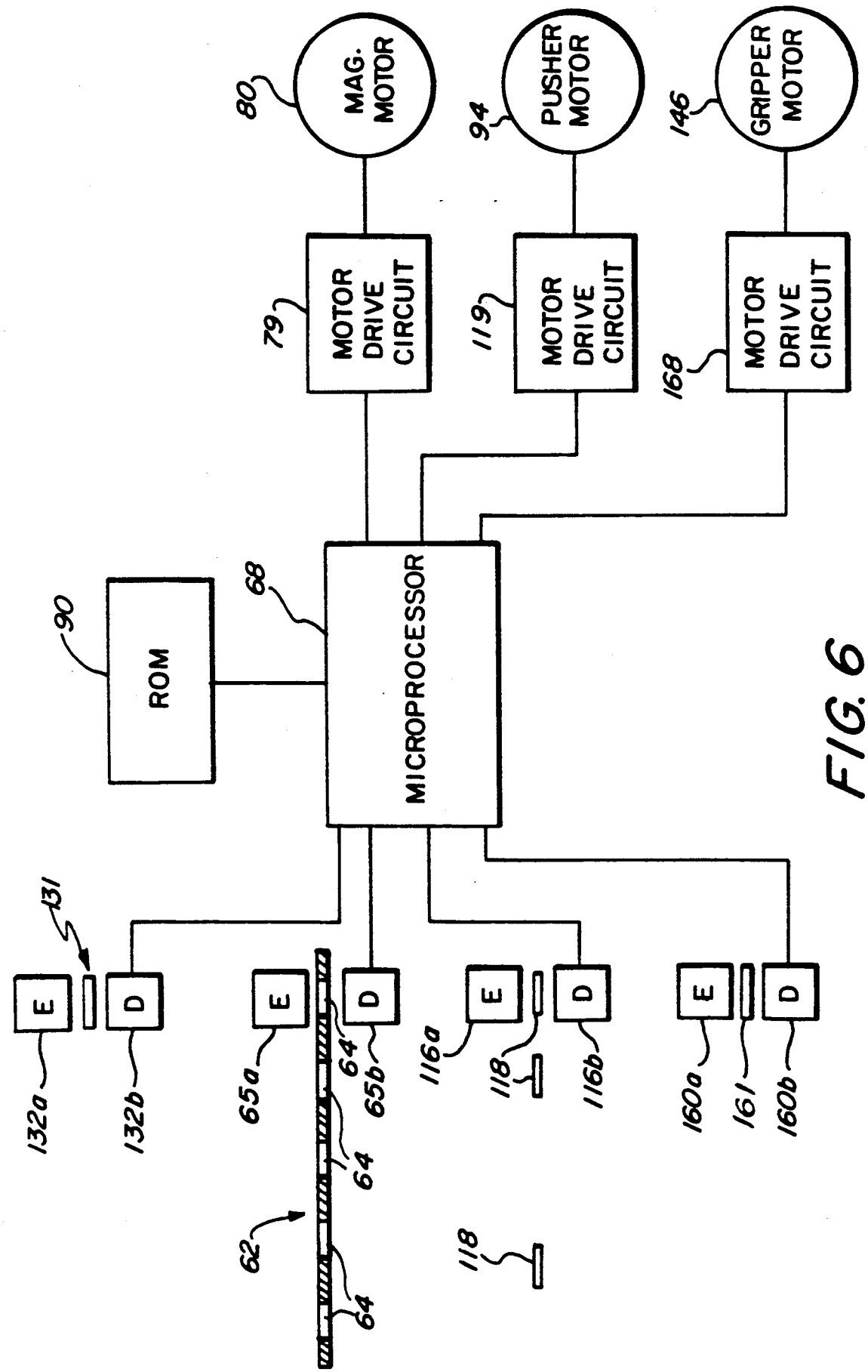
FIG. 6 is a schematic representation of the electronic circuitry of the cartridge loader.

Referring to FIGS. 4 and 6, mounted on the underside of the rectangular piece 109 along the side closer to the wall of the housing of the loader, is a pusher sensor 116. The sensor may be mounted so that it slides within the loop formed by the belt 100. The pusher sensor 116 of the preferred embodiment is an LED emitter 116a and a light detector 116b mounted on opposite sides of a C-bracket. Mounted along the wall of the loader 10, adjacent the pusher sensor are three flags 118, corresponding to the pusher's three stopping locations which will be described below. The flags are advantageously mounted away from a position where they might entangle the cable 29 providing power to the loader 10. The flags 118 may be of any flat, opaque material, however, they are preferably constructed of sheet metal. The flags 118 pass through the slot between the C-bracket of the sensor 116 during the motion of the pusher 91. When the sensor 116 passes through the flags 118 the light is blocked as a signal that the pusher is in one of the three stopping positions corresponding to that flag 118. As represented in FIG. 6, when the sensor 116 is over one of the flags 118, a signal is sent to the pusher motor drive circuit 119 and the information is stored in the memory circuit 90. Of course, other flag and sensor combinations known to those of skill in the art may substitute for the combination described here.

The pusher motor 94 is activated by the pusher motor drive circuit 119 after a slot 40 is vertically aligned with the acceptor of the cartridge drive 12. When the slot 40 is first aligned, the pusher will be at its rear-most location, or "Home" position. The pusher sensor 116 will be over the Home flag 122 when the pusher 91 is at this position. When voltage is applied to the pusher motor, the pusher gears 96 will engage, thereby moving the last gear 103 with an approximately 65:1 final gear ratio in the preferred embodiment. The last gear 103 will drive the belt 100 upon which the pusher is mounted, thereby moving the pusher 91. The pusher 91 moves through the "Deposit" position where the gripper 93 touches the cartridge 40 inside the slot 38. Advantageously, the gripper 93 and pusher 91 combination have a vertical height short enough and a side-to-side width thin enough to fit through the magazine slots 40.

When the pusher is at the Deposit position, the sensor 116 is over the Deposit flag 123. The pusher 91 continues moving past this position, thereby pushing the cartridge 38, until the pusher 91 reaches the "Load/Unload" position. The pusher motor will be signaled to stop moving by the sensor 116 being over the Load/Unload flag 124. While the accuracy of the stopping of the pusher is not as critical as that of the magazine, in a preferred embodiment, the pusher motor 94 can be stopped accurately using a method similar to that described above in connection with the stopping of the magazine motor 80. The velocity of the motor will be determined measuring the time it takes to move the pusher 91 between the Deposit and Load/Unload positions. When the pusher 91 reaches the Load/Unload position, the acceptor of the drive 12 will accept the cartridge 38 for engagement with the read/write head of the drive. The pusher waits at the Load/Unload position until the cartridge is returned.

When the cartridge is ejected by the acceptor of the drive 12, a cartridge present sensor activator 128, which is seen in FIG. 2, will be engaged. The cartridge present sensor activator 128 is located near the rear of the loader 10 over the magazine drive motor 80 and its gears 84. The cartridge present sensor activator 128 comprises a wedge shaped piece 129 which has a radial axle 130 and a sensor flag 131. The cartridge present sensor activator 128 is spring mounted so that it remains above the plane of the gear plate 89 unless a cartridge 38 is present over it. When the cartridge goes over the cartridge present sensor activator 128, the flag 131 slips into a generally C-shaped electrical cartridge present sensor 132, located underneath the cartridge present sensor activator 128. The sensor 132 comprises an emitter 132a and detector 132b, and communicates to the microprocessor 68, as represented in FIG. 6, that a cartridge 38 is present.

The pusher is provided with a gripper 93 in order to retrieve the cartridge when it is ejected by the drive 12. The gripper 93 of the preferred embodiment is an L-shaped piece, seen best in FIG. 2, which is held by a short axle 136 at its corner. The bottom of the gripper is bent up at its end in order to create a hook 140. The hook 140 engages the depression 46 found on the front of the cartridge 38 when the gripper closes on the cartridge in accordance with the preferred embodiment By partial rotation about the axle 136, the gripper can be moved from its open to its closed position and back. The gripper 93 is held in the closed position by a retaining spring 142. The axle 136 is mounted on the pusher carriage 106 so that the hook 140 remains underneath the tip of the pusher 91 at all times. Advantageously, the distance between the pusher 91 and the open position of the gripper hook is sufficient to enable a cartridge to slide loosely between them. Likewise, the distance between the pusher 91 and the closed position of the hook 140 is only sufficient to allow a cartridge to be gripped tightly between them.

The motion of the gripper 93 is controlled by a gripper motor 146 mounted vertically underneath the wide portion of the flat component 111 of the pusher 91, so that the motor 146 travels with the pusher 91 and griper 93. The motor 146, advantageously, is a stepper motor.

The motor 146, shown in FIG. 4, drives a gear train 150, seen in FIGS. 3 and 4. The gear train 150, advantageously rides on the part of the flat component 111 which is perpendicular to the pusher 91 and rectangular component 109. The last gear 152 of the gear train 150 rotates only ±30° and is prevented from moving further by the provision of a stop pin 154 on either side of the gear. The last gear 152 has grooves only on the side which connects to the remainder of the gear system 150. Opposite the grooved side of the last gear 152 there may be provided a flag 161, which will pass through a generally C-shaped gripper sensor 160, consisting of a LED emitter 160a and a detector 160b, which is also mounted on the pusher carriage 106. The in a preferred embodiment, may have a cutout which will pass through the sensor 160 to allow light to pass when the gripper is fully open. Alternatively, the flag may block light through the sensor 160 only when the gripper is fully open or closed. The gripper sensor 160, advantageously, is provided as an indication of whether the gripper is fully open or closed. Advantageously, as diagramed in FIG. 6, this information is passed to the microprocessor 68 which will send the information to be stored in the non-volatile memory device 90. In the preferred embodiment, the indication of the position of the gripper enables the gripper to prevent errors in loading or unloading. In a particularly preferred embodiment, the gripper motor will repeat an opening or closing motion until the proper indication from the gripper sensor 160 is received.

The last gripper gear 152 moves with rotational motion in the horizontal plane. This gear 152 is connected to a flat cam connector 162 which translates the rotational motion in the horizontal plane of the last gear 152 to linear motion. The cam connector 162 is connected to a cam 166 which pushes on the upright portion of the gripper 93 to put pressure against the gripper spring 142 overcoming the bias of the spring, thereby opening the gripper 93. Thus, the linear motion of the cam connector 162 is converted to a rotational motion of the gripper 93 in the vertical plane. The motion of the gripper motor 146 in the opposite direction will cause the cam 166 to release the pressure on the spring 142, thereby causing the gripper to close. Advantageously, the gripper 93 is biased closed through the action of the spring 142 rather than through action of the motor 146, thereby preventing excessive force from being applied to the cartridge 38 while it is gripped. Excessive force might crush the plastic case of a cartridge 38.

AUTOMATED OPERATION OF THE PREFERRED EMBODIMENT

Referring now to FIGS. 7a through 7l, there is shown a schematic representation of the operation of the automated cartridge loader 10 when connected to a cartridge drive 12 in accordance with the preferred embodiment.

Figure 7A:
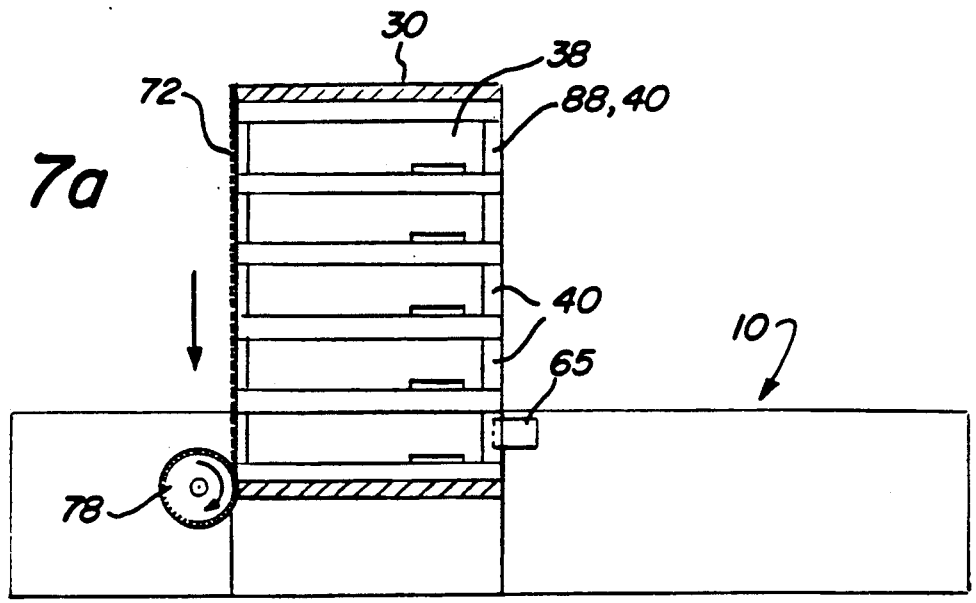
Figure 7B:
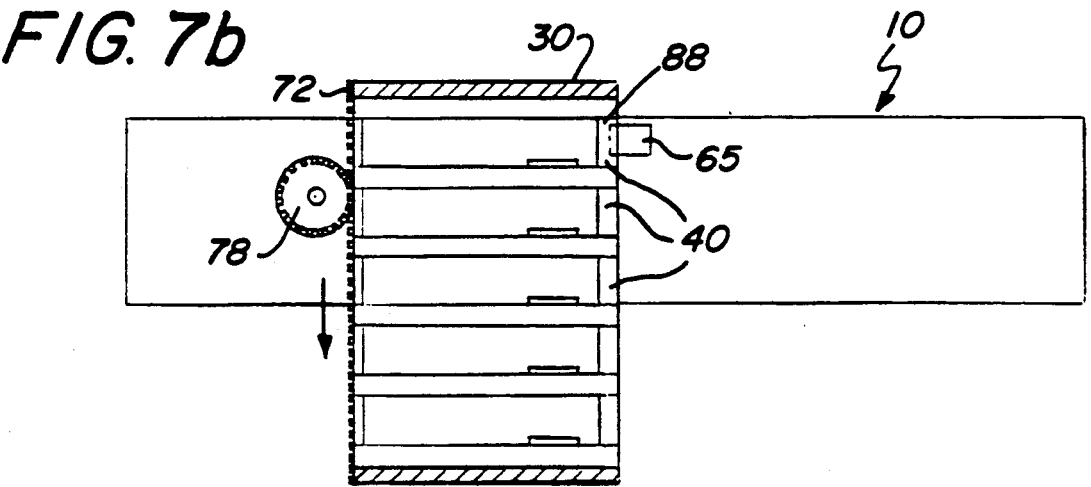

In FIG. 7a, there is shown a representation of a standard magazine 30 loaded with a cartridge 38 in each of its five slots 40. The magazine 30 has just been loaded by an operator into the magazine opening 34 so that the cartridges 38 within the slots 40 are aligned side to side with the acceptor of the drive 12, and the sensor 65 has sensed the insertion of the magazine 30. After a short delay, the magazine motor (shown at 80 in FIG. 3) will have driven the last gear 78 in a clockwise direction The last gear 78 is meshingly engaged with the rack 72 on the magazine 30, therefore, the magazine is driven downward. In the preferred embodiment, the sensor 65 counts four flags (shown at 64 in FIG. 1) and the sensor turns on a timer when the fourth (penultimate) flag arrives. The elapsed time between the fourth and fifth (last) flags is used to determine the width of the brake pulse as described above. The brake pulse is applied to accurately stop the magazine with the first slot 88 vertically aligned with the acceptor of the cartridge drive and with the pusher to arrive at the position shown in FIGS. 7b-7c. Advantageously, the bottom of the magazine 30 is above the top of a table upon which the drive and loader combination is horizontally mounted. In alternative embodiments, the magazine 30 is moved to a position wherein the cartridge 38 in the slot 40 corresponding to the first flag is in the same plane as the cartridge drive opening.

Figure 7C:
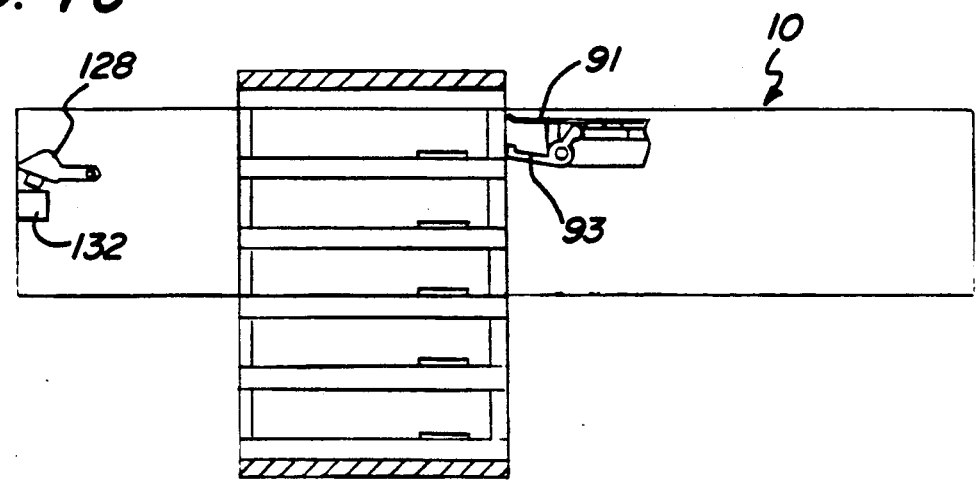
Figure 7D:
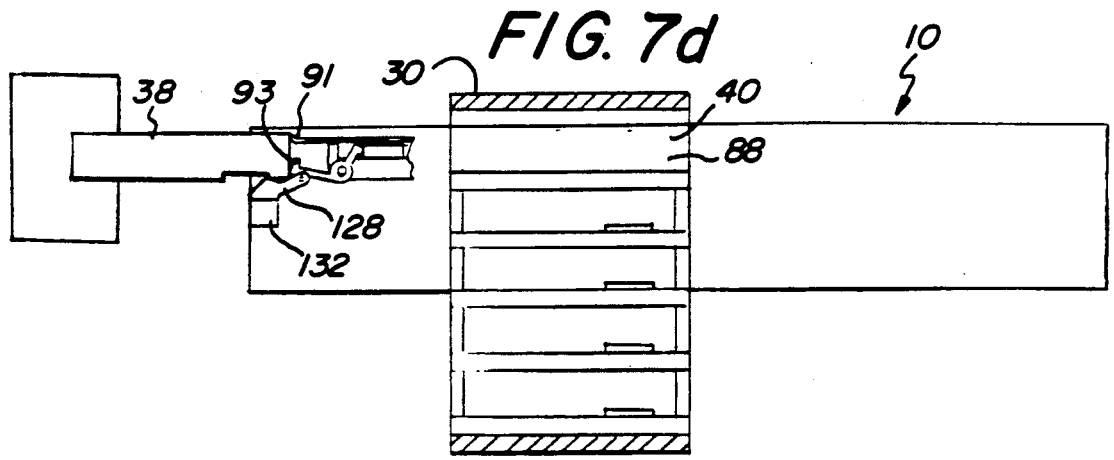
Figure 7E:
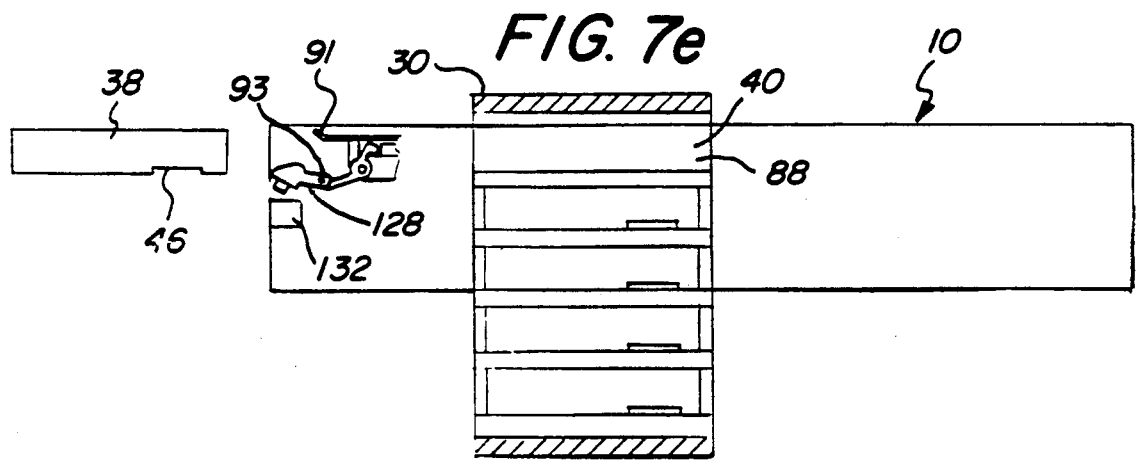

The load cycle is shown in FIGS. 7c through 7e. FIG. 7c shows the start of the first load cycle. The pusher 91 is at the Home position with the gripper 93 in the closed position. The pusher motor (shown at 94 in FIG. 3) is activated to move the pusher rearward through the Deposit position where it will make contact with the hereby pushing the cartridge and arriving at the position shown in FIG. 7d. As the cartridge 38 is pushed forward, the cartridge will go over the cartridge present sensor activator 128, thereby activating the cartridge present sensor 132 which will send a signal through the microprocessor 68 that a cartridge has gone into a position to be loaded into the drive. When the cartridge has been pushed to the Load/Unload position, the standard drive acceptor will physically remove the cartridge from the Load/Unload position and move it into engagement with the read/write head of the drive 12. FIG. 7e shows the pusher 91 at the Load/Unload position after the drive has removed the cartridge 38. After the drive has removed the cartridge, the cartridge present sensor 132 will detect that the cartridge is gone, sending a signal through the gripper drive motor circuit to start the gripper motor (shown at 146 in FIG. 4) to open the gripper 93 in preparation for the unload cycle. During this period, the drive will record or read the cartridge 38. When the cartridge is fully recorded the acceptor of the drive will eject the cartridge.

Figure 7F:
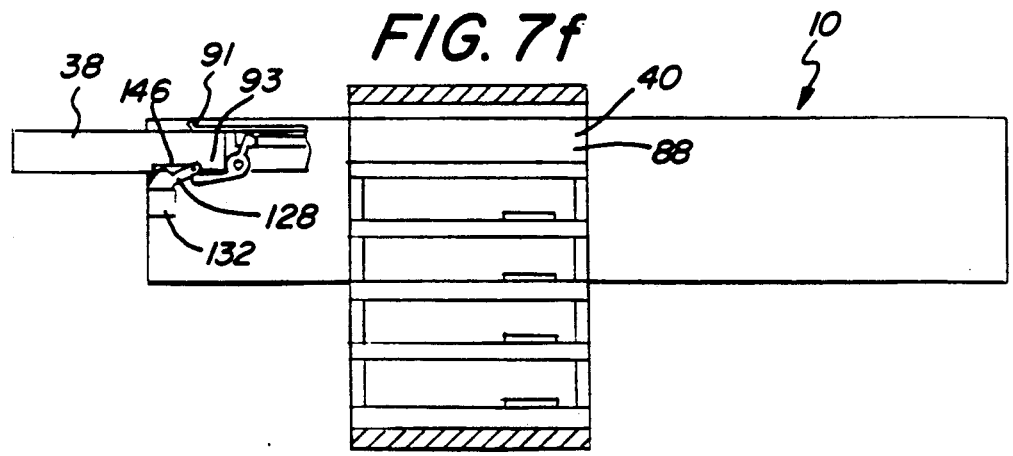

FIGS. 7f through 7j show the unload cycle. As shown in FIG. 7f, when the drive ejects the cartridge 38 the cartridge 38 will move over the cartridge present sensor activator 128 and thereby activate the cartridge present sensor 132. This will signal the gripper motor to close on the depression 46 at the front of the cartridge 38. Advantageously, the drive ejects the cartridge with a spring action, so that the cartridge will return all the way into the jaws of the gripper 93 and pusher 91 combination.

Once the gripper 93 is closed on the cartridge 38, the gripper 93 rides with the pusher 91 as the pusher motor pulls the pusher back to the Deposit position, as shown in FIG. 7g. When the pusher is at the Deposit position, the cartridge 38 will be in its slot 40, flush against the retaining block 37 of the magazine 30. The pusher motor may advantageously be stopped with a brake pulse applied at the Deposit position. The width of the brake pulse is determined by measuring the time to move the pusher from the Load/Unload position to the Deposit position and referring to a look-up table stored in the memory device (represented as 90 in FIG. 6), as described above in connection with the stopping of the magazine motor.

Figure 7J:
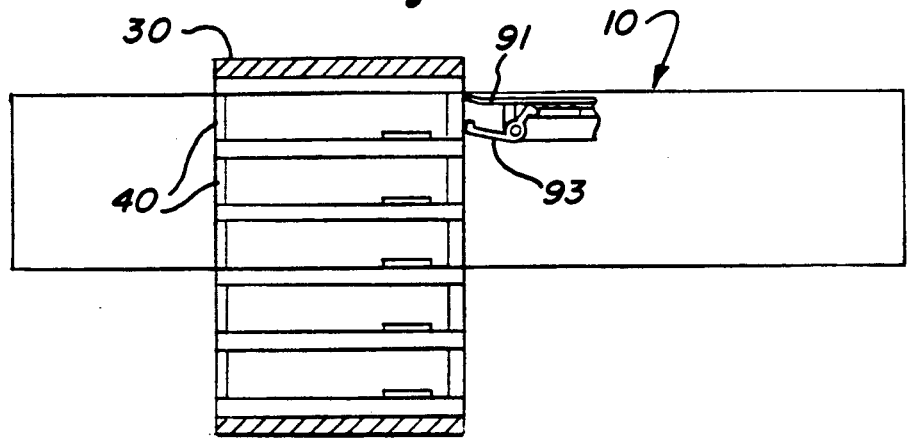
Figure 7K:
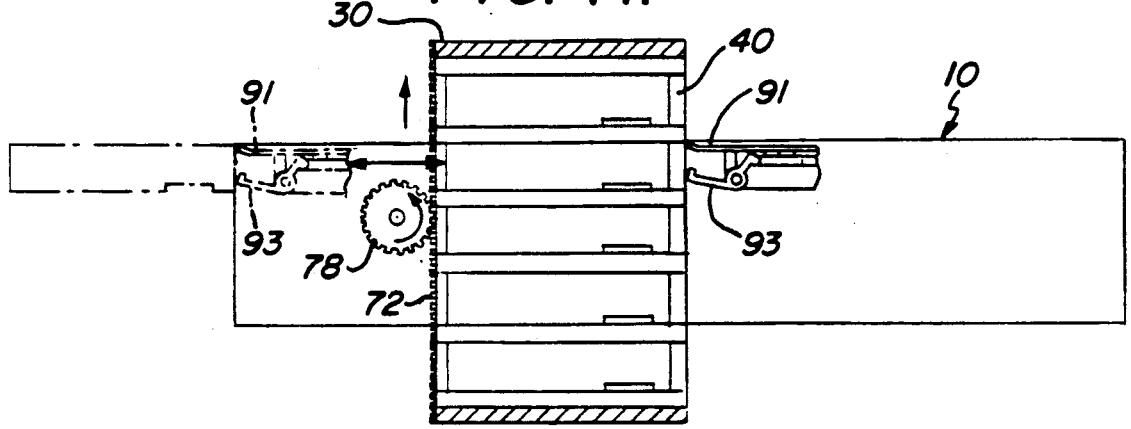

Once the cartridge is in its slot 40 in the magazine 30, the gripper motor will open the gripper 93, as shown in FIG. 7h. The pusher motor will then move the pusher 91 back to the Home position, as seen in FIG. 7i. The gripper motor will then close the gripper, as shown in FIG. 7j.

the next slot 40 is vertically aligned with the acceptor of the drive, as shown in FIG. 7k. In the preferred embodiment, the magazine 30 is moved up one slot 40 at a time. However, in other embodiments wherein the first cartridge 38 to be loaded is in the uppermost slot, the magazine 30 is moved downward. The time to move the magazine between the flags (seen at 64 in FIG. 1) will be measured in order to accurately stop the motor with a brake pulse as described above.

Figure 7L:
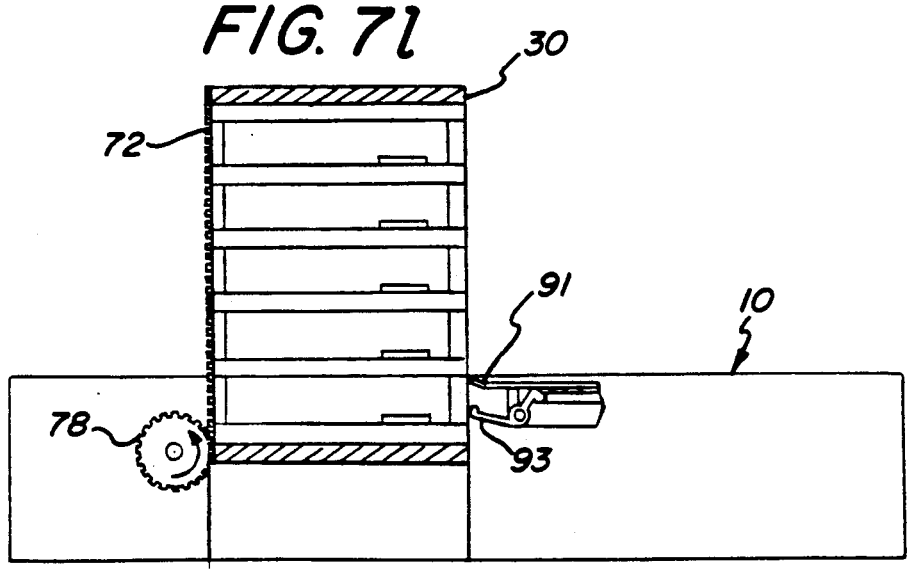

The load and unload cycles shown in FIGS. 7c to 7j, and the translation of magazine 30 as shown in FIG. 7k by the motion of the gripper 91, seen in phantom at the Load/Unload position, will repeat until either an empty slot is encountered by the cartridge present sensor after the pusher pushes through the slot to the Load/Unload position or until the cartridge in the fifth slot is returned to the magazine. When either event occurs, the pusher 91 returns to the Home position and the magazine drive motor moves the magazine 30 through the motion of its last gear 78 up to the eject position as shown in FIG. 7l.

In accordance with an improved cartridge loader, there may be provided a random access mode to provide access to the cartridges 38 in any order, through the provision of a user interface.

In accordance with the above description of the automated operation of the cartridge loader, there is provided a method of sequentially loading a plurality of cartridges into a cartridge drive. The method comprises loading the cartridges 38 into the magazine 30, loading the magazine 30 into the opening of the loader 34, causing the loader 10 to sequentially load each of the cartridges 38 into the cartridge drive 12, causing the cartridge drive 12 to record or read each of the cartridges 38 after it is loaded into the drive 12, causing the loader 10 to unload each of the cartridges 38 after the drive 12 records data on it, causing the loader 10 to eject the magazine 30, and removing the magazine 30 from the loader 10.

It will be appreciated that certain structural variations may suggest themselves to those skilled in the art. The foregoing detailed description of the preferred embodiments and their operation and method of use is to be clearly understood as given by way of illustration, the spirit and scope of this invention being limited solely by the appended claims.

We claim:

1. A loader, for loading each of a plurality of cartridges into a drive having an exposed space on at least one side and having a cartridge acceptor within said exposed space, comprising:

a housing having a conduit extending therethrough and having at least one open end, said conduit defining a channel, and said open end of said housing being mounted to said exposed space of said drive, said housing projecting away from said drive;

a holder, having a guide extending along a side thereof, mounted through said conduit with said guide in said channel, said holder defining a plurality of spaces, each of said plurality of spaces sized and shaped to receive a cartridge;

means for displacing said holder above or below said housing by generating motion and engaging said guide on said holder thereby transferring said motion to said holder, for selectably aligning each of said plurality of spaces with said cartridge acceptor; and a pusher supported by said housing for pushing a cartridge positioned within one of said plurality of spaces to said acceptor of said drive so that said acceptor accepts said cartridge, said pusher being driven by a pusher drive system which propels said pusher from a first position not touching said cartridge to a second position in contact with said cartridge.

2. The loader of claim 1, further comprising a gripper having a hook thereon for gripping a cartridge, upon ejection of said cartridge by said acceptor, said gripper being movable by said pusher to position said cartridge within one of said plurality of spaces.

3. The loader of claim 2, wherein said gripper is supported by said pusher.

4. The loader of claim 2, further comprising a gripper motor which operates said gripper.

5. The loader of claim 4, further comprising a reduction train connecting said gripper and said gripper motor.

6. The loader of claim 5, further comprising a biasing means which biases said gripper in a closed position, said motor selectively overcoming said biasing means to cause said gripper to open.

7. The loader of claim 5, further comprising a sensor for sensing whether said gripper is open or closed.

8. The loader of claim 1, wherein said means for displacing comprises:

a motor for producing said motion; and a reduction train which precisely transfers the motion produced by said motor to said guide on said holder, thereby facilitating the precise vertical alignment of said holder with said acceptor.

9. The loader of claim 5, further comprising a sensor supported by said housing to sense when said spaces are aligned with said acceptor.

10. The loader of claim 1, wherein said holder further comprises a plurality of retainers each of which corresponds to one of said plurality of spaces for retaining a cartridge within said one of said plurality of spaces and wherein said holder is removable for use as a cartridge storage container.

11. The loader of claim 1, wherein said loader will function when mounted in a drive with said opening of said housing facing vertically or horizontally.

12. The loader of claim 11, wherein access to additional internal drives is not blocked by attachment of said loader.

13. The loader of claim 11, wherein said drive will function regardless of the number of cartridges positioned within said spaces of said holder.

14. The loader of claim 1, wherein said housing is principally supported at its point of connection with said drive.

15. The loader of claim 1, wherein said guides are T-shaped.

16. The loader of claim 1, wherein there are at least two guides, each of said guides fitting within a complementary channel.

17. The loader of claim 16, wherein one of said guides fits into a complimentary channel more snugly than another of said guides fits into its complementary channel.

18. A loader, for loading each of a plurality of cartridges into a drive having an exposed space on at least one side and having a cartridge acceptor within said exposed space, comprising:

a housing having a conduit extending therethrough and having at least one open end, said open end of said housing being mounted to said exposed space of said drive, and said housing projecting away from said drive;

a holder, mounted through said conduit, said holder defining a plurality of spaces, each of said plurality of spaces sized and shaped to receive a cartridge;

means for displacing said holder above or below said housing for selectably aligning each of said plurality of spaces with said cartridge acceptor; and a pusher supported by said housing for pushing a cartridge positioned within one of said plurality of spaces to said acceptor of said drive so that said acceptor accepts said cartridge, said pusher being driven by a pusher drive system which propels said pusher from a first position not touching said cartridge to a second position in contact with said cartridge.

19. The loader of claim 18, wherein said holder comprises a means for engaging the displacing means and wherein the displacing means generates motion and displaces said holder by engaging the engaging means, thereby transferring said motion to said holder.

* * * * *

UNITED STATES PATENT AND TRADEMARK OFFICE
CERTIFICATE OF CORRECTION

PATENT NO.   : 5,050,020
DATED        : September 17, 1991
INVENTOR(S)  : Kenneth C. Campbell It is certified that error appears in the above-identified patent and that said Letters Patent is hereby corrected as shown below:

```
Column 2, line 11, change "due to preferences their for" to
--due to their preference for--.

Column 5, line 55 after "as"    add --    best seen in Figure 3.
The sensor may comprise a LED--

Column 10, line 14 after "The" add --flag,--.

Column 11, line 23, after "with the" add --cartridge 38 and move
on to the Load/Unload position,--. "hereby" should read --thereby--.

Column 12, line 7, add at the beginning of the line --The
magazine motor will then move the magazine 30 until--.
```

Signed and Sealed this

Twenty-seventh Day of April, 1993

*Attest:*

MICHAEL K. KIRK

*Attesting Officer*   Acting Commissioner of Patents and Trademarks